(12) United States Patent
Kim

(10) Patent No.: US 7,925,311 B2
(45) Date of Patent: Apr. 12, 2011

(54) KEYPAD FOR MOBILE PHONE

(75) Inventor: Young S. Kim, Los Altos, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 703 days.

(21) Appl. No.: 11/939,872

(22) Filed: Nov. 14, 2007

(65) Prior Publication Data

US 2008/0125192 A1    May 29, 2008

(30) Foreign Application Priority Data

Nov. 23, 2006    (KR) .................. 10-2006-0116429

(51) Int. Cl.
*H04B 1/06*    (2006.01)

(52) U.S. Cl. ........................... 455/575.1; 341/22

(58) Field of Classification Search ............ 455/550.1, 455/566, 575.1, 575.3, 575.4, 90.1–90.3; 345/169, 173, 164, 174; 341/176, 20, 22
See application file for complete search history.

(56) References Cited

U.S. PATENT DOCUMENTS

| | | | |
|---|---|---|---|
| 6,865,406 B2 | 3/2005 | Park | |
| 2005/0266898 A1* | 12/2005 | Ahn et al. | 455/575.1 |
| 2006/0187212 A1* | 8/2006 | Park et al. | 345/169 |
| 2008/0018607 A1* | 1/2008 | Joo | 345/169 |

FOREIGN PATENT DOCUMENTS

| | | |
|---|---|---|
| KR | 10-2005-0028254 | 5/2006 |
| KR | 100617821 | 8/2006 |
| KR | 10651821 | 11/2006 |

* cited by examiner

*Primary Examiner* — Thanh C Le
(74) *Attorney, Agent, or Firm* — H.C. Park & Associates, PLC

(57) ABSTRACT

A keypad for a mobile phone including a key arrangement having 9 number-keys and a 4-direction key surrounding one of the number-keys.

17 Claims, 4 Drawing Sheets

KEYPAD FOR MOBILE PHONE

CROSS REFERENCE TO RELATED APPLICATION

This application claims priority from and the benefit of Korean Patent Application No. 10-2006-0116429, filed on Nov. 23, 2006, which is hereby incorporated by reference for all purposes as if fully set forth herein.

BACKGROUND OF THE INVENTION

1. Field of the Invention

The present invention relates to a mobile phone, such as a digital multimedia broadcasting (DMB) phone, a gaming phone, a chatting phone, a camera phone, an MP3 phone, a cellular phone, a personal communication service (PCS) phone, a personal digital assistant (PDA), a hand held phone (HHP), and the like, and more particularly to a mobile phone keypad for data input.

2. Discussion of the Background

A mobile phone is an electronic appliance through which a user may conduct radio communication with others. Radio communication includes for example, voice calling, message transmission, file transferring, video calling, camera functions, and the like. Further, the mobile phone may also serve as a personal assistant by performing phone number management and personal schedule management.

Mobile phones tend to be compact, slim, portable, light appliances. They also are moving toward providing multimedia availability and a wider variety of services, such as games and other forms of entertainment. In the future, the mobile phone may not have only a simple function for voice calling, but also may have a multi-function including video calling, gaming, Internet, camera, and the like.

Such a conventional mobile phone may be classified into diverse types taking portability or ease of use into consideration according to its external shape. For example, a mobile phone may be categorized as a bar-type or a folder-type. A bar-type mobile phone is constructed to have a single housing in the shape of a bar and includes therein a data input/output unit, an antenna, and a transceiver. The folder-type mobile phone is constructed so that a folder is rotatably connected to a single bar-type housing by a hinge device. For example, the folder-type mobile phone may have a structure in which the folder is rotatably coupled to the main body by means of a hinge device, keys are disposed on the main body side, and a display is disposed on the folder side, which may be advantageous in miniaturization and portability.

Such a folder-type mobile phone is disclosed in U.S. Pat. No. 6,865,406.

In addition, the mobile phone may be categorized as a swing-type or a sliding-type according to the manner in which it opens/closes. The swing-type mobile phone is configured so that two housings face each other and one of the housings may swing away from the other housing to open the mobile terminal. The sliding-type mobile phone is configured so that two housings thereof face each other, one of which slides in a longitudinal direction along the other housing, thereby opening/closing the mobile terminal.

A swing-type mobile phone is disclosed in Korean Patent Application No. 2005-28254, which was filed by the assignee of the present application.

However, in the mobile phone of that application, a 4-direction key is disposed on the swing housing, which restricts widening of the display disposed on the swing housing. Therefore, in order to widen the display, the swing housing may need to be larger.

Further, if the 4-direction key is disposed on the main housing side, the main housing may become larger due to the installation of the 4-direction key. This may disadvantageously limit miniaturizing and slimming of the mobile phone.

Of course, keys selected among keys of a keypad on the main housing may be used both as functional keys and 4-direction keys, but it may be inconvenient for the user to manipulate the keys. Therefore, a mobile phone that can mount a 4-direction key without variance in the main body size and used independently in a specified mode is desirable.

SUMMARY OF THE INVENTION

The present invention provides a mobile phone in which a 4-direction key is installed in a restricted space, which may minimize the installing space.

Also, the present invention provides a mobile phone that may be convenient for use in a 4-direction key operation mode, e.g., a navigation mode or a DMB mode.

Further, the present invention provides a mobile phone in which a 4-direction key is disposed around a key positioned at the center of number keys, which may minimize the installing space of a keypad.

Furthermore, the present invention provides a keypad for a mobile phone having 3×3 key arrangement that may optimize key arrangement in a restricted space of a main body thereof.

Additional features of the invention will be set forth in the description which follows, and in part will be apparent from the description, or may be learned by practice of the invention.

The present invention discloses a keypad for a mobile phone. The keypad includes a key arrangement having 9 numeric keys and a 4-direction key surrounding one of the numeric keys.

The present invention also discloses a keypad for a mobile phone including a 3×4 key arrangement having number-keys and a 4-direction key surrounding one of the number-keys.

The present invention also discloses a keypad for a mobile phone including a 3×3 key arrangement having a plurality of keys and a 4-direction key surrounding a center key of the plurality of keys.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
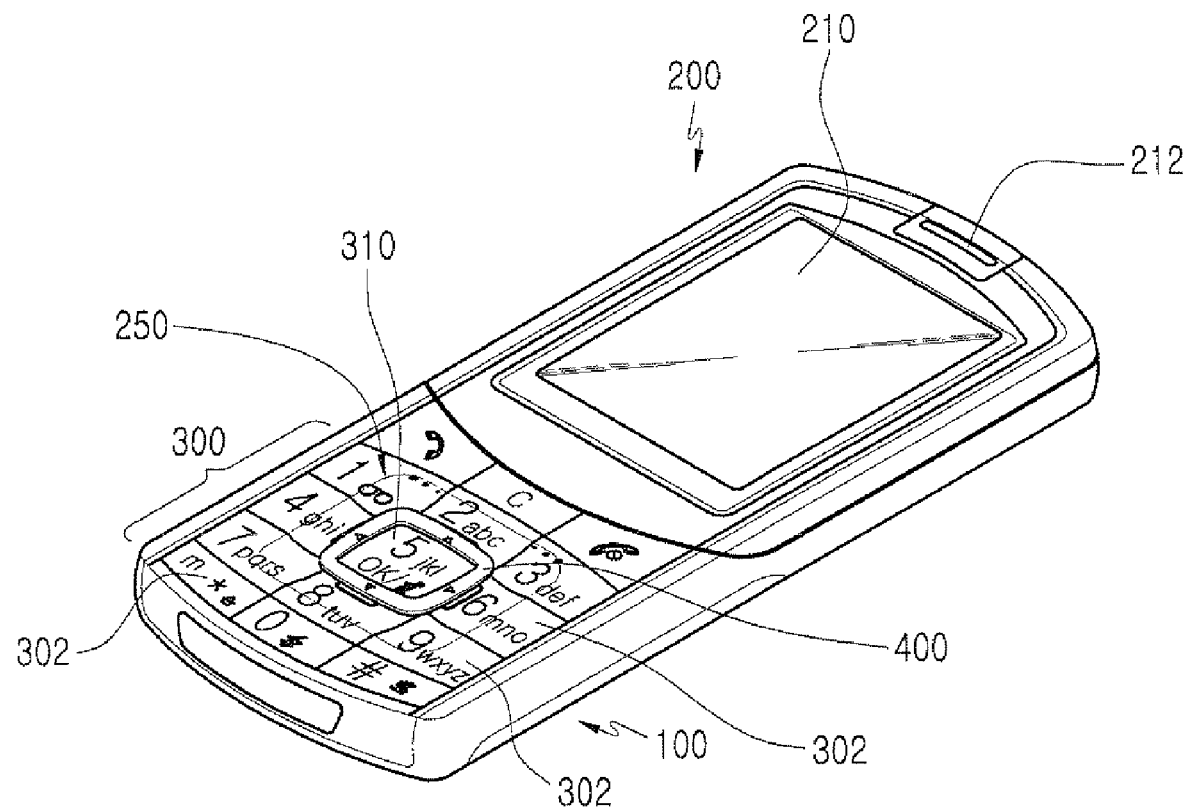
FIG. 1 and FIG. 2 are perspective views of a mobile phone according to an exemplary embodiment of the present invention.

The present invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

The present invention proposes a keypad for a mobile phone for use in data input.

Figure 2:
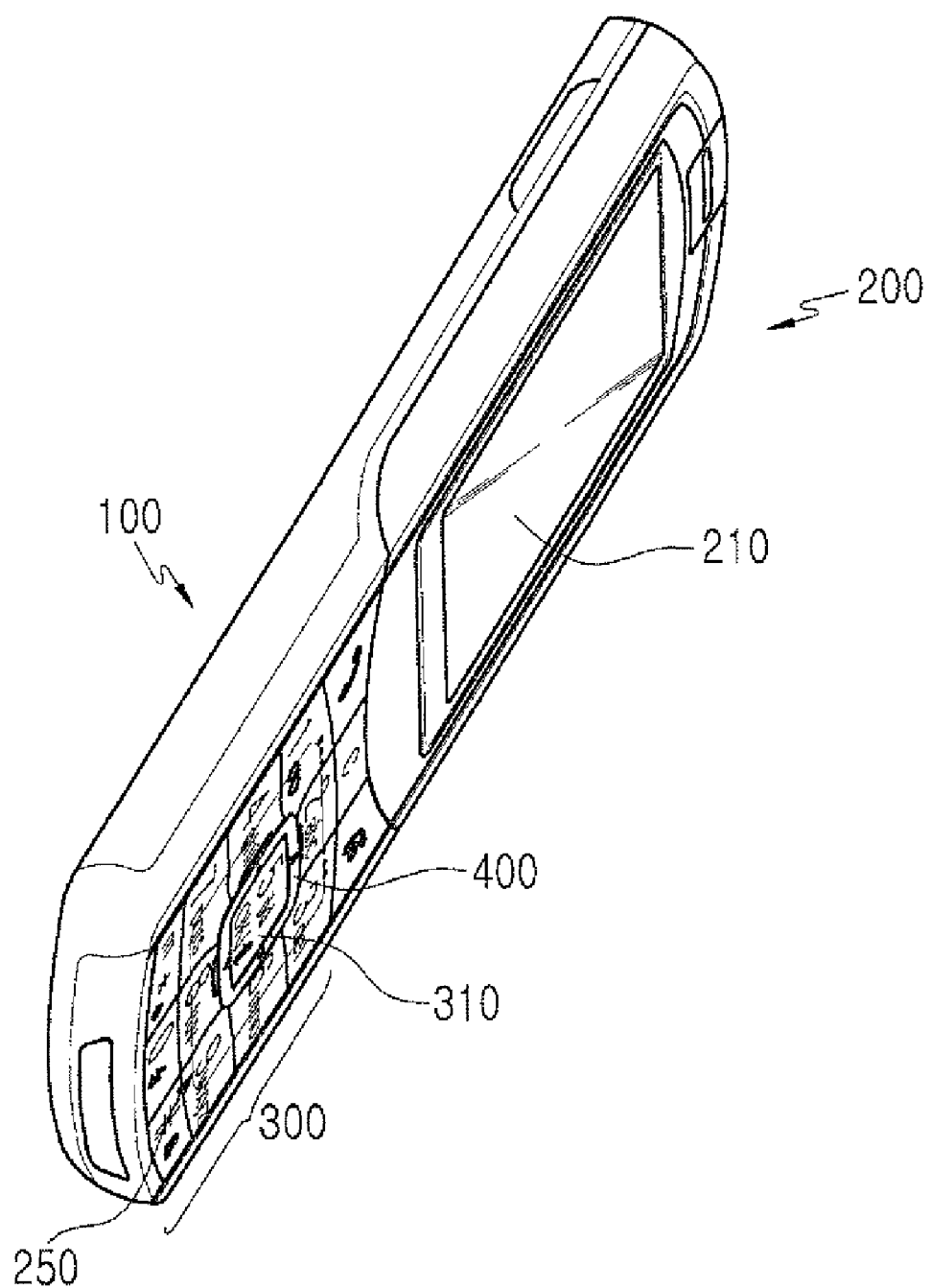
Figure 3:
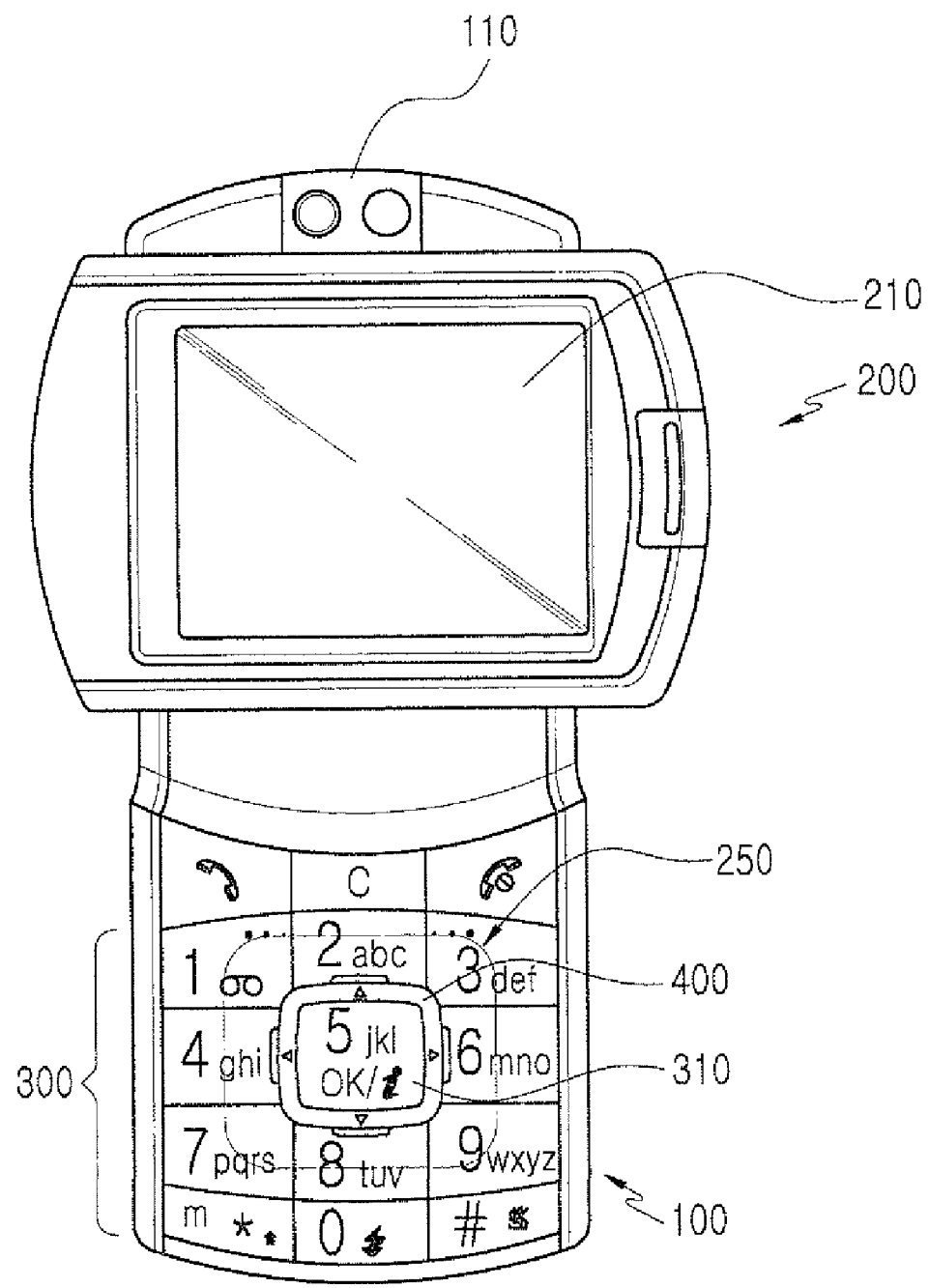
FIG. 3 is a front view of the mobile phone according to an exemplary embodiment of the present invention in which a swing housing thereof is rotated approximately 90 degrees.
Figure 4:
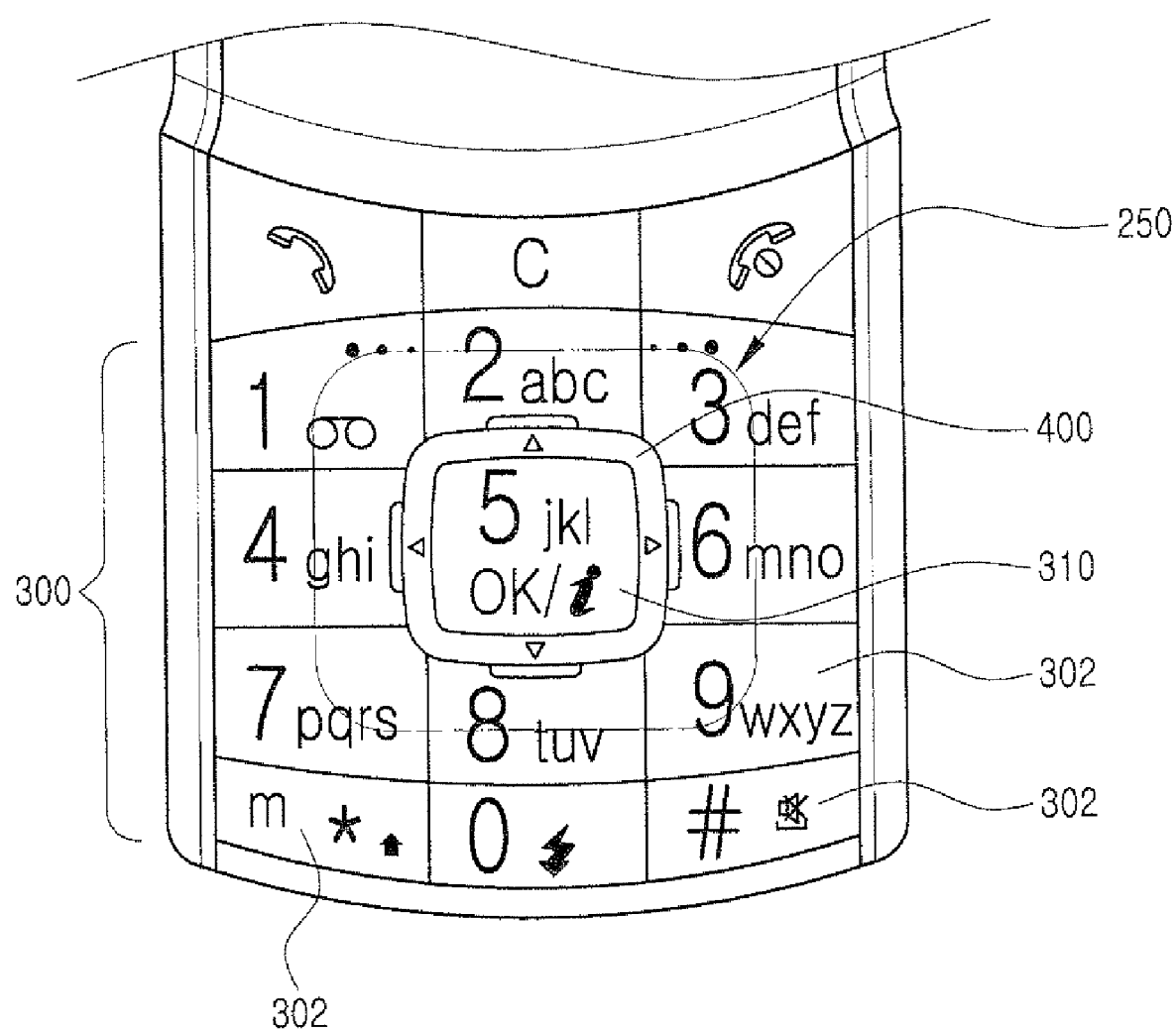
FIG. 4 is an enlarged partial front view of a keypad provided in the mobile phone according to an exemplary embodiment of the present invention.

In FIG. 1, FIG. 2, and FIG. 3, the mobile phone includes a main body 100 and a swing housing 200 that may swing while facing the main body 100. The swing housing 200 is positioned at the upper portion of the upper face of the main body 100, and the keypad 250 is disposed on the lower portion of the upper face of the main body 100. The keypad 250 has a key arrangement including a plurality of keys. A speaker 212 and a display 210 may be provided on the swing housing 200. Thus, the state of the mobile phone shown in FIG. 1 is convenient for a phone mode, and the state of the mobile phone shown in FIG. 3 is convenient for a DMB mode or a navigation mode. As shown in FIG. 3, a rotatable camera module 110 may be installed on the upper portion of the main body 100 so as to be exposed or covered according to the swinging of the swing housing 200.

In FIG. 1, FIG. 2, FIG. 3, and FIG. 4, the keypad 250 of the mobile phone is a data input device installed on the upper face of the main body 100. The keypad 250 includes a 3×4 key arrangement 300 having number-keys 302 (i.e. "1", "2", "3", "4", "6", "7", "8", "9", "*", "0", and "#") and 310 ("5"). The key arrangement 300 of the keypad 250 includes the number-keys 302 and 310 and a 4-direction key 400 surrounding the numeric key "5" 310. The 4-direction key 400 may be disposed between the numeric key "5" 310 and the other number-keys 302 so as to completely surround the numeric key "5" 310. That is, the 4-direction key 400 may be a closed loop in which the numeric key "5" 310 is disposed.

Preferably, the 4-direction key 400 arranged in the 3×4 key arrangement 300 may be used as a navigation key. In a navigation mode, the mobile phone may be in the state shown in FIG. 3.

The keypad 250 of the present invention is configured such that the 4-direction key 400 is higher than the number-keys 302 and 310. This may allow for easy touching recognition of the 4-direction key 400 for a user. Alternatively, the 4-direction key 400 may be configured so that the upper face thereof is composed of a material different from the number-keys 302 and 310 so as to distinguish it from the others. As yet another alternative, the 4-direction key 400 may have a different surface treatment than the number-keys 302 and 310.

Meanwhile, the present invention is not limited to the 3×4 key arrangement 300 including text keys, function keys, number-keys and others, but may include a keypad adopting a 3×3 key arrangement.

That is, a 3×3 key arrangement may include a plurality of keys in a 3×3 array and a 4-direction key surrounding a center key among the plurality of keys, thereby providing the same effect as the former exemplary embodiment. The center key may correspond to the numeric key "5". Further, also in a 3×3 key arrangement, the 4-direction key may be configured so that it surrounds the center key completely and is a level higher than the plurality of keys.

As set forth before, according to exemplary embodiments of the present invention, the number-keys and the 4-direction key may be installed together in a restricted space, which may minimize the installation space required and provide for miniaturization of a mobile phone. Particularly, the arrangement may make it convenient to use the mobile phone in a navigation mode in which the 4-direction key is used.

It will be apparent to those skilled in the art that various modifications and variations can be made in the present invention without departing from the spirit or scope of the invention. Thus, it is intended that the present invention cover the modifications and variations of the invention provided they come within the scope of the appended claims and their equivalents.

What is claimed is:

1. A keypad for a mobile phone, comprising:
a key arrangement comprising number-keys; and
a 4-direction key surrounding one of the number-keys,
wherein the 4-direction key is disposed between the surrounded number-key and the other number-keys.

2. The keypad for a mobile phone of claim 1, wherein the 4-direction key completely surrounds one of the number-keys.

3. The keypad for a mobile phone of claim 1, wherein the keypad is installed on a main body of the mobile phone, the main body further comprising:
a swing housing on an upper portion of the upper face of the main body, the swing housing comprising a display.

4. The keypad for a mobile phone of claim 1, wherein the 4-direction key is configured so that the upper face thereof is higher than the upper faces of the number-keys.

5. The keypad for a mobile phone of claim 1, wherein the 4-direction key has a surface treatment that is different from a surface treatment of the number-keys.

6. The keypad for a mobile phone of claim 1, wherein the 4-direction key is capable of being used as a navigation key.

7. The keypad for a mobile phone of claim 1, wherein the 4-direction key is a closed loop.

8. The keypad for a mobile phone of claim 1, wherein the number keys comprise keys labeled "1", "2", "3", "4", "5", "6", "7", "8", and "9", respectively.

9. The keypad for a mobile phone of claim 8, wherein the 4-direction key surrounds the number key labeled "5".

10. The keypad for a mobile phone of claim 1, wherein the 4-direction key is a direction key only.

11. The keypad for a mobile phone of claim 1, wherein the 4-direction key is disposed directly between the one of the number keys and each immediately adjacent number key.

12. The keypad for a mobile phone of claim 1, wherein the keypad is installed on a main body of the mobile phone, the main body further comprising:
a swing housing on an upper portion of the upper face of the main body, the swing housing comprising a display, and
wherein the mobile phone has a single key arrangement comprising number keys and a single 4-direction key.

13. A keypad for a mobile phone, comprising:
a 3×4 key arrangement comprising number-keys; and
a 4-direction key surrounding one of the number-keys,
wherein the 4-direction key is disposed between the surrounded number-key and the other number-keys such that the 4-direction key completely surrounds the number-key.

14. The keypad for a mobile phone of claim 13, wherein the 4-direction key is configured so that the upper face thereof is higher than the upper faces of the number-keys.

15. The keypad for a mobile phone of claim 13, wherein the number keys comprise keys labeled "1", "2", "3", "4", "5", "6", "7", "8", and "9", respectively.

16. The keypad for a mobile phone of claim 15, wherein the 4-direction key surrounds the number key labeled "5".

17. A keypad for a mobile phone, comprising:
a 3×3 key arrangement comprising a plurality of keys and a 4-direction key surrounding a center key of the plurality of keys,
wherein the 4-direction key is disposed between the center key and the other keys.

* * * * *